US007157526B2

(12) United States Patent
Nickolaus et al.

(10) Patent No.: US 7,157,526 B2
(45) Date of Patent: Jan. 2, 2007

(54) AQUEOUS PRIMARY DISPERSION, SUBSTANTIALLY OR COMPLETELY DEVOID OF VOLATILE ORGANIC SUBSTANCES, METHOD FOR THE PRODUCTION THEREOF AND USE OF THE SAME

(75) Inventors: Ralf Nickolaus, Drensteinfurt (DE); Heinz-Peter Rink, Münster (DE); Reinhold Clauss, Münster (DE); Elisabeth Wessling, Emsdetten (DE); Wilma Löcken, Haltern (DE); Nicole Freitag, Münster (DE); Dunja Mikolajetz, Ascheberg (DE)

(73) Assignee: BASF Coatings AG, Munster (DE)

( * ) Notice: Subject to any disclaimer, the term of this patent is extended or adjusted under 35 U.S.C. 154(b) by 201 days.

(21) Appl. No.: 10/250,586

(22) PCT Filed: Feb. 13, 2002

(86) PCT No.: PCT/EP02/01461

§ 371 (c)(1), (2), (4) Date: Jul. 2, 2003

(87) PCT Pub. No.: WO02/064652

PCT Pub. Date: Aug. 22, 2002

(65) Prior Publication Data

US 2004/0048968 A1 Mar. 11, 2004

(30) Foreign Application Priority Data

Feb. 13, 2001 (DE) ................................ 101 06 567

(51) Int. Cl.
*C08F 283/02* (2006.01)

(52) U.S. Cl. ...................... 525/445; 525/437; 525/168; 525/169; 525/172; 524/845

(58) Field of Classification Search ................ 524/846, 524/845; 523/165; 525/168, 169, 172, 445, 525/437, 165
See application file for complete search history.

(56) References Cited

U.S. PATENT DOCUMENTS

| | | | | |
|---|---|---|---|---|
| 4,413,036 A | | 11/1983 | Drexler et al. | 428/458 |
| 4,521,580 A | | 6/1985 | Turner et al. | 526/307.2 |
| 4,636,545 A | | 1/1987 | König et al. | |
| 4,677,003 A | | 6/1987 | Redlich et al. | 427/373 |
| 5,047,454 A | | 9/1991 | Cowles et al. | 523/500 |
| 5,126,393 A | | 6/1992 | Blum et al. | 524/538 |
| 5,516,559 A | | 5/1996 | Röckrath et al. | 427/407.1 |
| 5,521,229 A | | 5/1996 | Lu et al. | 522/40 |
| 5,565,508 A | | 10/1996 | Hoenel et al. | 523/414 |
| 5,601,880 A | | 2/1997 | Schwarte et al. | 427/407.1 |
| 5,670,557 A | | 9/1997 | Dietz et al. | 522/184 |
| 5,830,927 A | | 11/1998 | Vanderhoff et al. | 522/81 |
| 5,830,928 A | | 11/1998 | Faler et al. | 523/502 |
| 5,854,353 A | | 12/1998 | Knoll et al. | 525/314 |
| 5,859,112 A | | 1/1999 | Overbeek et al. | 524/460 |
| 5,905,132 A | | 5/1999 | Wegner et al. | 528/45 |
| 5,959,026 A | | 9/1999 | Abusleme et al. | 524/758 |
| 5,972,809 A | * | 10/1999 | Faler et al. | 442/103 |
| 5,990,221 A | | 11/1999 | Dames et al. | 524/457 |
| 6,020,438 A | | 2/2000 | Lubnin et al. | 525/317 |
| 6,140,386 A | | 10/2000 | Vanderhoff et al. | 522/78 |
| 6,160,049 A | | 12/2000 | Mathauer et al. | 524/804 |
| 6,180,181 B1 | * | 1/2001 | Verardi et al. | 427/409 |
| 6,221,949 B1 | | 4/2001 | Gross et al. | 524/451 |
| 6,281,272 B1 | * | 8/2001 | Baldy et al. | 523/501 |
| 6,462,139 B1 | | 10/2002 | Das et al. | |
| 6,503,983 B1 | | 1/2003 | Morrison et al. | 524/804 |
| 6,512,026 B1 | | 1/2003 | Ott et al. | |
| 6,534,588 B1 | | 3/2003 | Löcken et al. | 524/591 |
| 6,670,043 B1 | | 12/2003 | Barkac et al. | |
| 2005/0124757 A1 | * | 6/2005 | Rink et al. | 524/589 |

FOREIGN PATENT DOCUMENTS

| | | |
|---|---|---|
| CA | 2004988 | 12/1989 |
| CA | 2086156 | 12/1992 |
| CA | 2127919 | 7/1994 |
| CA | 2181934 | 7/1996 |
| DE | 100 18 601 | 10/2001 |
| EP | 429207 | 11/1990 |
| EP | 401565 | 12/1990 |
| EP | 498583 | 1/1992 |
| EP | 576943 | 6/1993 |
| EP | 644205 | 8/1994 |
| EP | 755 946 | 7/1996 |
| WO | WO92/13903 | 8/1992 |

(Continued)

OTHER PUBLICATIONS

English Translation for BASF Corporation, et al., U.S. Appl. No. 10/049,607, filed Feb. 14, 2002.

(Continued)

*Primary Examiner*—David W. Wu
*Assistant Examiner*—Rip A. Lee

(57) ABSTRACT

Aqueous primary dispersion, substantially or entirely free of volatile organic compounds, and comprising dispersed and/or emulsified, solid and/or liquid polymer particles and/or dispersed solid core/shell particles with a particle diameter≦500 nm, preparable by free-radical micro- or mini-emulsion polymerization of at least one olefinically unsaturated monomer in the presence of at least one hydrophobic additive and of at least one oligomeric polyester with a number-average molecular weight of from 150 to 1 500 daltons, a hydroxyl number of from 100 to 1 000 mg KOH/g, and an acid number<20 mg KOH/g and also a process for preparing it and its use as a coating material, adhesive or sealing compound or to prepare a coating material, an adhesive or a sealing compound.

21 Claims, No Drawings

FOREIGN PATENT DOCUMENTS

| | | |
|---|---|---|
| WO | WO95/34586 | 12/1995 |
| WO | WO96/15157 | 5/1996 |
| WO | WO9749739 | 12/1997 |
| WO | WO98/01478 | 1/1998 |
| WO | WO 98/37104 | 8/1998 |
| WO | WO 99/00426 | 1/1999 |
| WO | WO 99/10413 | 3/1999 |
| WO | WO02/064692 | 8/2002 |

OTHER PUBLICATIONS

English Translation for BASF Corporation, et al., U.S. Appl. No. 10/049,656, filed Feb. 13, 2002.

English Translation for BASF Corporation, et al., U.S. Appl. No. 10/169,473, filed Jun. 28, 2002.

English Translation for BASF Corporation, et al., U.S. Appl. No. 10/148,427, filed May 29, 2002.

English Translation for BASF Corporation, et al., U.S. Appl. No. 09/263,426, filed Mar. 5, 1999.

English Translation for BASF Corporation, et al., U.S. Appl. No. 10/148,428, filed May 29, 2002.

English Translation for BASF Corporation, et al., U.S. Appl. No. 10/148,295, filed May 29, 2002.

English Translation for BASF Corporation, et al., U.S. Appl. No. 09/926,532, filed Nov. 16, 2001.

English Translation for BASF Corporation, et al., U.S. Appl. No. 09/830,694, filed Sep. 21, 1999.

JP07-316264, Derwent Accession No. 1996-056019, Dec. 5, 1995.

English Translation for BASF Corporation, et al., U.S. Appl. No. 10/239,938, Filed.

English Translation of WO02/064692 Published Aug. 22, 2002.

* cited by examiner

AQUEOUS PRIMARY DISPERSION, SUBSTANTIALLY OR COMPLETELY DEVOID OF VOLATILE ORGANIC SUBSTANCES, METHOD FOR THE PRODUCTION THEREOF AND USE OF THE SAME

CROSS REFERENCE TO RELATED APPLICATIONS

This application is a National Phase Application of Patent Application PCT/EP02/01461 filed on 13 Feb. 2002, which claims priority to DE 101 06 567.1, filed on 13 Feb. 2001.

The present invention relates to novel aqueous primary dispersions comprising dispersed and/or emulsified, solid and/or liquid polymer particles and/or dispersed solid core/shell particles with a diameter≦500 nm. Furthermore, the present invention relates to a novel process for preparing the novel aqueous primary dispersions by free-radical micro- and miniemulsion polymerization. The present invention further relates to the use of the novel aqueous primary dispersions as coating materials, adhesives, and sealing compounds, or for producing coating materials, adhesives, and sealing compounds, especially coating materials for producing single-coat or multicoat clearcoats and single-coat or multicoat color and/or effect coating systems for automotive OEM finishing, the painting of buildings inside and outside, the coating of doors, windows, and furniture, industrial coating, including coil coating, container coating, and the impregnation and/or coating of electrical components, and the coating of white goods, including domestic appliances, boilers, and radiators.

Microemulsions and miniemulsions are dispersions comprising water, an oil phase, and one or more surface-active substances, having droplet sizes of from 5 to 50 nm (microemulsions) or from 50 to 500 nm. Microemulsions are considered thermodynamically stable, whereas the miniemulsions are regarded as being metastable (cf. Emulsion Polymerization and Emulsion Polymers, edited by P. A. Lovell and Mohamed S. El-Aasser, John Wiley and Sons, Chichester, N.Y., Weinheim, 1997, pages 700 et seq.; Mohamed S. El-Aasser, Advances in Emulsion Polymerization and Latext Technology, 30th Annual Short Course, Volume 3, Jun. 7–11, 1999, Emulsion Polymers Institute, Lehigh University, Bethlehem, Pa., USA). Both types of dispersion are employed widely in industry, for example, in cleaning products, cosmetics or bodycare products. However, they may also be used instead of the customary macroemulsions, with droplet sizes >1 000 nm, for polymerization reactions.

The preparation of aqueous primary dispersions by means of free-radical miniemulsion polymerization is known, for example, from the International patent application WO 98/02466 or from the German patents DE 196 28 143 A1 and DE 196 28 142 A1. In the case of these known processes, the monomers may be copolymerized in the presence of different low molecular mass, oligomeric or polymeric hydrophobic substances, also referred to as costabilizers. Furthermore, hydrophobic organic auxiliaries of low solubility in water, such as plasticizers, agents which improve the tack of the resulting film, film-forming auxiliaries, or other, unspecified organic additives, may be incorporated into the monomer droplets of the miniemulsion. The patents do not reveal the use of the known aqueous primary dispersions to prepare coating materials.

Aqueous coating materials based on aqueous primary dispersions comprising solid core/shell particles and prepared by miniemulsion polymerization of monomers in the presence of hydrophobic polymers are known from the patents EP-A-0 401 565, WO 97/49739 and EP-A-0 755 946. These patents do not reveal the use of oligomeric polyesters having comparatively high hydroxyl numbers. As clearcoat materials, however, the known aqueous coating materials produce clearcoats which tend to develop turbidities (haze).

The German patent application DE 199 59 928.9 of BASF Coatings AG, bearing the internal file reference PAT 99 174 DE and the title "Aqueous primary dispersions and coating materials, process for their preparation, and their use" and unpublished at the priority date of the present specification, describes aqueous primary dispersions and coating materials comprising dispersed and/or emulsified, solid and/or liquid polymer particles and/or dispersed solid core/shell particles having a diameter≦500 nm, preparable by free-radical micro- or miniemulsion polymerization of at least one olefinically unsaturated monomer in the presence of at least one hydrophobic crosslinking agent for the (co)polymer resulting from the monomer or monomers.

The German patent application DE 199 59 927.0 of BASF Coatings AG, bearing the internal file reference PAT 99 173 DE and the title "Aqueous primary dispersions and coating materials, process for their preparation, and their use" and unpublished at the priority date of the present specification, describes aqueous primary dispersions and coating materials comprising dispersed and/or emulsified, solid and/or liquid polymer particles and/or dispersed solid core/shell particles having a diameter≦500 nm, preparable by free-radical micro- or miniemulsion polymerization of an olefinically unsaturated monomer and a diarylethylene.

The German patent application DE 199 24 674.2 of BASF Coatings AG, bearing the internal file reference PAT 99 198 DE and the title "Aqueous primary dispersions and coating materials, process for their preparation, and their use" and unpublished at the priority date of the present specification, describes aqueous primary dispersions and coating materials comprising dispersed and/or emulsified, solid and/or liquid polymer particles and/or dispersed solid core/shell particles having a diameter≦500 nm, preparable by free-radical micro- or miniemulsion polymerization of an olefinically unsaturated monomer and a diarylethylene in the presence of at least one hydrophobic crosslinking agent for the copolymer resulting from the monomers.

The German patent application DE 100 05 814.1 of BASF Coatings AG, bearing the internal file reference PAT 00 253 DE and the title "Aqueous primary dispersions, process for their preparation, and their use" and unpublished at the priority date of the present specification, describes aqueous primary dispersions and coating materials comprising dispersed and/or emulsified, solid and/or liquid polymer particles and/or dispersed solid core/shell particles having a diameter≦500 nm, preparable by free-radical micro- or miniemulsion polymerization of at least one olefinically unsaturated monomer in the presence of at least one polyhydroxy-functionalized cyclic and/or acyclic alkane having 9 to 16 carbon atoms in the molecule.

The German patent application DE 100 18 601.7 of BASF Coatings AG, bearing the internal file reference PAT 00 256 DE and the title "Aqueous primary dispersions and coating materials, process for their preparation, and their use" and unpublished at the priority date of the present specification, describes aqueous primary dispersions and coating materials comprising dispersed and/or emulsified, solid and/or liquid polymer particles and/or dispersed solid core/shell particles having a diameter≦500 nm, preparable by free-radical micro- or miniemulsion polymerization of at least one olefinically unsaturated monomer in the presence of at least one hydrophobic crosslinking agent for the (co)polymer resulting from the monomer or monomers, the monomer or monomers being dispersed in an aqueous dispersion of the crosslinking agent or crosslinking agents prior to the (co) polymerization.

The use of oligomeric polyesters having comparatively high hydroxyl numbers is not described in the patent applications unpublished at the priority date of the present specification.

It is an object of the present invention to provide a novel aqueous primary dispersion, substantially or entirely free of volatile organic compounds, and comprising dispersed and/or emulsified, solid and/or liquid polymer particles and/or dispersed solid core/shell particles with a particle diameter≦500 nm, preparable by free-radical micro- or miniemulsion polymerization of at least one olefinically unsaturated monomer in the presence of at least one hydrophobic additive. The novel aqueous primary dispersion should be suitable per se as a novel aqueous coating material, adhesive or sealing compound substantially or entirely free of volatile organic compounds or for preparing a novel coating material, adhesive or sealing compound substantially or entirely free of volatile organic compounds. The novel aqueous primary dispersion and the novel aqueous coating material, adhesive or sealing compound should be stable on storage. The novel coating material should be suitable in particular for producing single-coat and multicoat clearcoats which no longer tend toward turbidities (haze) and which have a particularly smooth surface and a particularly good overall appearance.

The invention accordingly provides the novel aqueous primary dispersion, substantially or entirely free of volatile organic compounds, and comprising dispersed and/or emulsified, solid and/or liquid polymer particles and/or dispersed solid core/shell particles with a particle diameter≦500 nm, preparable by free-radical micro- or miniemulsion polymerization of at least one olefinically unsaturated monomer in the presence of at least one hydrophobic additive and of at least one oligomeric polyester with a number-average molecular weight of from 150 to 1 500 daltons, a hydroxyl number of from 100 to 1 000 mg KOH/g, and an acid number<20 mg KOH/g.

In the text below, the novel aqueous primary dispersion substantially or entirely free of volatile organic compounds is referred to as the "primary dispersion of the invention".

The invention additionally provides the novel process for preparing an aqueous primary dispersion, substantially or entirely free of volatile organic compounds, which comprises (co)polymerizing by free-radical micro- or miniemulsion polymerization at least one olefinically unsaturated monomer in the presence of at least one hydrophobic additive and of at least one oligomeric polyester with a number-average molecular weight of from 150 to 1 500 daltons, a hydroxyl number of from 100 to 1 000 mg KOH/g, and an acid number<20 mg KOH/g.

In the text below, the novel process for preparing an aqueous primary dispersion substantially or entirely free of volatile organic compounds is referred to as the "process of the invention".

Further subject matter of the invention will emerge from the ensuing description.

The primary dispersions of the invention comprise dispersed and/or emulsified solid and/or liquid polymer particles and/or dispersed solid core/shell particles. The size of the polymer particles or of the dispersed core/shell particles is a direct consequence of the process of the invention described below. The average particle diameter is below 500 nm. It is preferably from 10 to 500 nm, more preferably from 50 to 400 nm, and with very particular preference from 100 to 350 nm. The primary dispersions of the invention have an advantageously high solids content of, for example, more than 20% by weight, preferably more than 30% by weight. It is even possible to achieve solids contents of over 40% by weight. The primary dispersions of the invention have a low viscosity even with a high solids content, which represents a further particular advantage of the primary dispersions of the invention and of the coating materials, adhesives or sealing compounds of the invention prepared from them.

The core/shell particles result from the graft copolymerization of organic solids and the monomers described below. The organic solids are preferably hydrophobic polymers, as described for example in the patents EP 0 401 565 A1, page 3, line 5 to page 4 line 50, WO 97/49739, page 4 line 19 to page 5 line 3, and EP 0 755 946 A1, page 3 line 26 to page 5 line 38. These hydrophobic polymers may also be prepared by miniemulsion polymerization.

The primary dispersions of the invention may also have a bimodal particle size distribution in which from 0.1 to 80% by weight, in particular from 1.0 to 50% by weight, of the (co)polymers resulting from the monomers have a particle size, determined using an analytical ultracentrifuge, of from 20 to 500 nm, in particular from 50 to 300 nm, and from 20 to 99.9% by weight, in particular from 50 to 99% by weight, of the copolymer have a particle size of from 200 to 1500 nm, in particular from 300 to 900 nm, with the particle sizes differing by at least 50 nm, in particular by at least 100 nm, with very particular preference by at least 200 nm. For further details of the measurement method, reference is made to lines 5 to 9 of page 6 of the German patent application DE 196 28 142 A1.

The starting compound for the preparation of the primary dispersions of the invention and for the process of the invention is at least one olefinically unsaturated monomer.

It is preferred to copolymerize at least two, in particular at least three, different monomers with one another.

With particular preference, the monomers are copolymerized by controlled free-radical microemulsion or miniemulsion polymerization, especially miniemulsion polymerization. For this purpose at least one of the monomers is selected from the group consisting of the monomers of the general formula I $$R^1R^2C{=}CR^3R^4 \quad \text{(I).}$$

In the general formula I, the radicals $R^1$, $R^2$, $R^3$ and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals.

Examples of suitable alkyl radicals are methyl, ethyl, propyl, isopropyl, n-butyl, isobutyl, tert-butyl, amyl, hexyl, and 2-ethylhexyl.

Examples of suitable cycloalkyl radicals are cyclobutyl, cyclopentyl, and cyclohexyl.

Examples of suitable alkylcycloalkyl radicals are methylenecyclohexane, ethylenecyclohexane, and propane-1,3-diylcyclohexane.

Examples of suitable cycloalkylalkyl radicals are 2-, 3- or 4-methyl-, -ethyl-, -propyl-, and -butylcyclohex-1-yl.

Examples of suitable aryl radicals are phenyl, naphthyl, and biphenylyl, preferably phenyl and naphthyl, and especially phenyl.

Examples of suitable alkylaryl radicals are benzyl and ethylene- and propane-1,3-diylbenzene.

Examples of suitable cycloalkylaryl radicals are 2-, 3-, and 4-phenylcyclohex-1-yl.

Examples of suitable arylalkyl radicals are 2-, 3-, and 4-methyl-, -ethyl-, -propyl-, and -butylphen-1-yl.

Examples of suitable arylcycloalkyl radicals are 2-, 3-, and 4-cyclohexylphen-1-yl.

The above-described radicals $R^1$, $R^2$, $R^3$ and $R^4$ may be substituted. Electron-withdrawing or electron-donating atoms or organic radicals may be used for this purpose.

Examples of suitable substituents are halogen atoms, especially chlorine and fluorine, nitrile groups, nitro groups, partially or fully halogenated, especially chlorinated and/or fluorinated, alkyl, cycloalkyl, alkylcycloalkyl, cycloalkylalkyl, aryl, alkylaryl, cycloalkylaryl, arylalkyl and arylcycloalkyl radicals, including those exemplified above, especially tert-butyl; aryloxy, alkyloxy, and cycloalkyloxy radicals, especially phenoxy, naphthoxy, methoxy, ethoxy, propoxy, butyloxy or cyclohexyloxy; arylthio, alkylthio and cycloalkylthio radicals, especially phenylthio, naphthylthio, methylthio, ethylthio, propylthio, butylthio or cyclohexylthio; hydroxyl groups; and/or primary, secondary and/or tertiary amino groups, especially amino, N-methylamino, N-ethylamino, N-propylamino, N-phenylamino, N-cyclohexylamino, N,N-dimethylamino, N,N-diethylamino, N,N-dipropylamino, N,N-diphenylamino, N,N-dicyclohexylamino, N-cyclohexyl-N-methylamino or N-ethyl-N-methylamino.

Examples of monomers I used with particular preference are diphenylethylene, dinaphthaleneethylene, cis- and trans-stilbene, vinylidenebis(4-N,N-dimethylaminobenzene), vinylidenebis(4-aminobenzene), and vinylidenebis(4-nitrobenzene).

The above-described monomers I may be used individually or as a mixture of at least two monomers I.

Where used, the proportion of the above-described monomers I in the monomer mixture, based in each case on the monomer mixture, is preferably 0.01 to 10, more preferably from 0.1 to 9.0, with particular preference from 0.15 to 8.0, with very particular preference from 0.2 to 7.0, and in particular from 0.25 to 6.0% by weight.

With regard to the reaction regime and to the properties of the resulting copolymers, especially the acrylic copolymers, diphenylethylene is of very particular advantage and is therefore used with very particular preference.

For the process of the invention, the use of at least one monomer I has the further important advantage that the primary dispersions of the invention may be prepared in batch mode without any incidence of overheating of the reaction mixture, let alone reactor runaway.

It is further of advantage if at least one of the monomers other than the monomers I contains reactive functional groups (a) which are able to undergo thermally initiated crosslinking reactions with groups of the same kind or with complementary reactive functional groups (b). These reactive functional groups (a) or (b), or (a) and (b), may be present in the (co)polymers which result from the monomers described below, or from the monomers described below and the monomers I described-above, and which accordingly have self-crosslinking properties. Correspondingly, the primary dispersions of the invention in question and the coating materials, adhesives, and sealing compounds of the invention prepared from them are self-crosslinking.

The complementary reactive functional groups (a) or (b) may, however, also be present in the crosslinking agents described below, which are added to the primary dispersions of the invention before, during and/or after, especially before, their preparation. Accordingly, the primary dispersions of the invention in question and the coating materials, adhesives, and sealing compounds of the invention prepared from them are externally crosslinking.

For further details of the terms "self-crosslinking" and "externally crosslinking", reference is made to Römpp Lexikon Lacke und Druckfarben, Georg Thieme Verlag, Stuttgart, N.Y., 1998, "curing", pages 274 to 276.

Examples of suitable complementary reactive functional groups (a) and (b) are compiled in the following overview. In the overview, the variable R represents an acyclic or cyclic aliphatic radical, an aromatic radical and/or an aromatic-aliphatic (araliphatic) radical; the variables R' and R" represent identical or different aliphatic radicals or are linked with one another to form an aliphatic or heteroaliphatic ring.

Overview: Examples of Complementary Functional Groups (a) and (b)

| (a) Monomer and<br>(a) Crosslinking agent and | (b) Crosslinking agent<br>or<br>(b) Monomer |
|---|---|
| —SH | —C(O)—OH |
| —$NH_2$ | —C(O)—O—C(O)— |
| —OH | —NCO |
| —O—(CO)—NH—(CO)—$NH_2$ | —NH—C(O)—OR |
| —O—(CO)—$NH_2$ | —$CH_2$—OH |
| >NH | —$CH_2$—O—R |
| | —NH—$CH_2$—OH |
| | —NH—$CH_2$—O—R |
| | —N(—$CH_2$—O—R)$_2$ |
| | —NH—C(O)—CH(—C(O)OR)$_2$ |
| | —NH—C(O)—CH(—C(O)OR)<br>(—C(O)—R) |
| | —NH—C(O)—NR'R" |
| | >Si(OR)$_2$ |

-continued

| (a) Monomer and<br>(a) Crosslinking agent and | (b) Crosslinking agent<br>or<br>(b) Monomer |
|---|---|
| | 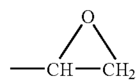 |
| —C(O)—OH | 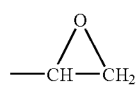 |

The selection of the respective complementary groups (a) or (b), or (a) and (b), is guided on the one hand by the consideration that during the storage of primary dispersions of the invention the groups should not enter into any unwanted reactions and/or, if appropriate, should not disrupt or inhibit additional curing with actinic radiation, and on the other-hand by the temperature range within which crosslinking is to take place.

With the primary dispersions of the invention and the coating materials, adhesives, and sealing compounds prepared from them it is preferred to employ crosslinking temperatures from room temperature up to 180° C. It is therefore preferred to employ monomers containing thio, hydroxyl, methylol, methylol ether, N-methylol, N-alkoxymethylamino, imino, carbamate, allophanate and/or carboxyl groups, but in particular amino, alkoxymethylamino or hydroxyl groups, especially hydroxyl groups, on the one hand, and crosslinking agents containing anhydride, carboxyl, epoxy, blocked isocyanate, urethane, methylol, methylol ether, N-methylol, N-alkoxymethylamino, siloxane, amino, hydroxyl and/or beta-hydroxyalkylamide groups, but in particular blocked isocyanate, urethane or methylol ether groups, on the other. For the preparation of self-crosslinking primary dispersions of the invention it is preferred to use methylol, methylol ether, N-methylol and N-alkoxymethylamino groups.

It is also possible to use monomers other than the above-described monomers I and the above-described monomers containing reactive functional groups. These monomers preferably contain no reactive functional groups. These monomers may also, apart from monomers (3), be used as the sole monomers.

Examples of suitable monomers which contain reactive functional groups or no reactive functional groups and which are other than the above-described monomers I are (1) substantially acid-group-free (meth)acrylic esters such as (meth)acrylic alkyl or cycloalkyl esters having up to 20 carbon atoms in the alkyl radical, especially methyl, ethyl, propyl, n-butyl, sec-butyl, tert-butyl, hexyl, ethylhexyl, stearyl and lauryl acrylate or methacrylate; cycloaliphatic (meth)acrylic esters, especially cyclohexyl, isobornyl, dicyclopentadienyl, octahydro-4,7-methano-1H-indenemethanol acrylate or tert-butylcyclohexyl (meth)acrylate; (meth)acrylic oxaalkyl esters or oxacycloalkyl esters such as ethyltriglycol (meth)acrylate and methoxyoligoglycol (meth)acrylate having a molecular weight Mn of preferably 550, or other ethoxylated and/or propoxylated hydroxyl-free (meth)acrylic acid derivatives. These may contain minor amounts of (meth)acrylic alkyl or cycloalkyl esters of higher functionality, such as the di(meth)acrylates of ethylene glycol, propylene glycol, diethylene glycol, dipropylene glycol, butylene glycol, 1,5-pentanediol, 1,6-hexanediol, octahydro-4,7-methano-1H-indenedimethanol or 1,2-, 1,3- or 1,4-cyclohexanediol; trimethylolpropane di- or tri(meth)acrylate; or pentaerythritol di-, tri- or tetra(meth)acrylate. For the purposes of the present invention, minor amounts of monomers of higher functionality in this case are to be understood as amounts which do not lead to crosslinking or gelling of the copolymers.

(2) Monomers which carry per molecule at least one hydroxyl group, amino group, alkoxymethylamino group or imino group and are substantially free from acid groups, such as hydroxyalkyl esters of acrylic acid, methacrylic acid or another alpha,beta-olefinically unsaturated carboxylic acid, which derive from an alkylene glycol esterified with the acid, or which are obtainable by reacting the alpha,beta-olefinically unsaturated carboxylic acid with an alkylene oxide, especially hydroxyalkyl esters of acrylic acid, methacrylic acid, ethacrylic acid, crotonic acid, maleic acid, fumaric acid or itaconic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate, crotonate, maleate, fumarate or itaconate; or hydroxycycloalkyl esters such as 1,4-bis(hydroxymethyl)cyclohexane, octahydro-4,7-methano-1H-indenedimethanol or methylpropanediol monoacrylate, monomethacrylate, monoethacrylate, monocrotonate, monomaleate, monofumarate or monoitaconate; or reaction products of cyclic esters, such as epsilon-caprolactone, for example, and these hydroxyalkyl or hydroxycycloalkyl esters; or olefinically unsaturated alcohols such as allyl alcohol or polyols such as trimethylolpropane monoallyl or diallyl ether or pentaerythritol monoallyl, diallyl or triallyl ether (as far as these monomers (2) of higher functionality are concerned, the comments made above relating to the monomers (1) of higher functionality apply analogously); aminoethyl acrylate, aminoethyl methacrylate, allylamine or N-methyliminoethyl acrylate or N,N-di(methoxymethyl)aminoethyl acrylate and methacrylate or N,N-di(butoxymethyl)aminopropyl acrylate and methacrylate;

(3) Monomers which carry per molecule at least one acid group which can be converted into the corresponding acid anion group, such as acrylic acid, methacrylic acid, ethacrylic acid, crotonic acid, maleic acid, fumaric acid or itaconic acid; olefinically unsaturated sulfonic or phosphonic acids or their partial esters; or mono(meth)acryloyloxyethyl maleate, succinate or phthalate. In the context of the present invention, the monomers (3) are used preferably not as the sole monomers but always in conjunction with other monomers, and only in amounts so low that the monomers (3) do not polymerize outside of the droplets of the miniemulsion.

(4) Vinyl esters of alpha-branched monocarboxylic acids having 5 to 18 carbon atoms in the molecule. The branched monocarboxylic acids may be obtained by reacting formic acid or carbon monoxide and water with olefins in the presence of a liquid, strongly acidic catalyst; the olefins may be cracking products of paraffinic hydrocarbons, such as mineral oil fractions, and may comprise both branched and straight-chain acyclic and/or cycloaliphatic olefins. The reaction of such olefins with formic acid or, respectively, with carbon monoxide and water produces a mixture of carboxylic acids in which the carboxyl groups are located predominantly on a quaternary carbon atom. Examples of other olefinic starting materials are propylene trimer, propylene tetramer and diisobutylene. Alternatively, the vinyl esters (4) may be prepared in a conventional manner from the acids, by reacting, for example, the acid with acetylene. Particular preference, owing to their ready availability, is given to using vinyl esters of saturated aliphatic monocarboxylic acids having 9 to 11 carbon atoms that are branched on the alpha carbon atom, but especially Versatic® acids (cf. Römpp, op. cit., "Versatic® acids", pages 605 and 606).

(5) Reaction products of acrylic acid and/or methacrylic acid with the glycidyl ester of an alpha-branched monocarboxylic acid having 5 to 18 carbon atoms per molecule, especially a Versatic® acid, or, instead of the reaction product, an equivalent amount of acrylic acid and/or methacrylic acid which is then reacted during or after the polymerization reaction with the glycidyl ester of an alpha-branched monocarboxylic acid having 5 to 18 carbon atoms per molecule, especially a Versatic® acid.

(6) Cyclic and/or acyclic olefins such as ethylene, propylene, 1-butene, 1-pentene, 1-hexene, cyclohexene, cyclopentene, norbornene, butadiene, isoprene, cyclopentadiene and/or dicyclopentadiene.

(7) (Meth)acrylamides such as (meth)acrylamide, N-methyl-, N-ethyl-, N-propyl-, N-butyl-, N-cyclo-hexyl-, and/or N-methylol-, N,N-dimethylol-, N-methoxymethyl-, N,N-di(methoxymethyl)-, N-ethoxymethyl- and/or N,N-di(ethoxyethyl)(meth)acrylamide;

(8) Monomers containing epoxide groups, such as the glycidyl ester of acrylic acid, methacrylic acid, ethacrylic acid, crotonic acid, maleic acid, fumaric acid and/or itaconic acid.

(9) Vinylaromatic hydrocarbons such as styrene, alpha-alkylstyrenes, especially alpha-methylstyrene, and/or vinyltoluene; vinylbenzoic acid (all isomers), N,N-diethylaminostyrene (all isomers), alpha-methylvinylbenzoic acid (all isomers), N,N-diethylamino-alpha-methylstyrene (all isomers) and/or p-vinylbenzenesulfonic acid.

(10) Nitriles such as acrylonitrile and/or methacrylonitrile.

(11) Vinyl compounds, especially vinyl halides and/or vinylidene dihalides such as vinyl chloride, vinyl fluoride, vinylidene dichloride or vinylidene difluoride; N-vinylamides such as vinyl-N-methylformamide, N-vinylcaprolactam, 1-vinylimidazole or N-vinylpyrrolidone; vinyl ethers such as ethyl vinyl ether, n-propyl vinyl ether, isopropyl vinyl ether, n-butyl vinyl ether, isobutyl vinyl ether and/or vinyl cyclohexyl ether; and/or vinyl esters such as vinyl acetate, vinyl propionate, vinyl butyrate, vinyl pivalate and/or the vinyl ester of 2-methyl-2-ethylheptanoic acid.

(12) Allyl compounds, especially allyl ethers and allyl esters such as allyl methyl, ethyl, propyl or butyl ether or allyl acetate, propionate or butyrate.

(13) Acryloxysilane-containing vinyl monomers, preparable by reacting hydroxyl-functional silanes with epichlorohydrin and then reacting the reaction product with (meth)acrylic acid and/or with hydroxyalkyl and/or hydroxycycloalkyl esters of (meth)acrylic acid (cf. monomers (2)).

(14) Polysiloxane macromonomers having a number-average molecular weight Mn of from 1 000 to 40 000 and having on average from 0.5 to 2.5 ethylenically unsaturated double bonds per molecule; especially polysiloxane macromonomers having a number-average molecular weight Mn of from 2 000 to 20 000, with particular preference from 2 500 to 10 000 and, in particular, from 3 000 to 7 000 and having on average from 0.5 to 2.5, preferably from 0.5 to 1.5, ethylenically unsaturated double bonds per molecule, as are described in DE 38 07 571 A1 on pages 5 to 7, in DE 37 06 095 A1 in columns 3 to 7, in EP 0 358 153 B1 on pages 3 to 6, in U.S. Pat. No. 4,754,014 A1 in columns 5 to 9, in DE 44 21 823 A1 or in the international patent application WO 92/22615 on page 12 line 18 to page 18 line 10.

Further examples of suitable monomers are disclosed in the German patent application DE 196 28 142 A1, page 2 line 50 to page 3 line 7.

The monomers are preferably selected so as to give (meth)acrylic copolymers whose profile of properties is determined primarily by the (meth)acrylates described above. As comonomers it is then preferred to use vinyl aromatic hydrocarbons (9), especially styrene.

The monomers described above are reacted with one another in the presence of at least one water- and/or oil-soluble, free-radical initiator to form copolymers. Examples of initiators which can be used are: dialkyl peroxides, such as di-tert-butyl peroxide or dicumyl peroxide; hydroperoxides, such as cumene hydroperoxide or tert-butyl hydroperoxide; peresters, such as tert-butyl perbenzoate, tert-butyl perpivalate, tert-butyl per-3,5,5-trimethylhexanoate or tert-butyl per-2-ethylhexanoate; peroxodicarbonates such as bis (4-tert-butylcyclohexyl) peroxodicarbonate potassium, sodium or ammonium peroxodisulfate; azo initiators, examples being azodinitriles such as azobisisobutyronitrile; C—C-cleaving initiators such as benzpinacol silyl ethers; or a combination of a nonoxidizing initiator with hydrogen peroxide. Further examples of suitable initiators are described in the German patent application DE 196 28 142 A1, page 3 line 49 to page 4 line 6. Combinations of these initiators may also be used.

It is preferred to add comparatively large amounts of free-radical initiator, the amount of at least one initiator used, per 100 parts by weight of monomers being preferably from 1 to 20, more preferably from 2 to 19, with particular preference from 3 to 18, with very particular preference from 4 to 17, and in particular from 5 to 15 parts by weight.

The monomers described above are polymerized or copolymerized in the presence of at least one hydrophobic additive.

The quality of being "hydrophobic" refers to the constitutional property of a molecule or functional group to behave exophilically with respect to water; in other words, it displays the tendency not to penetrate into water, or to depart the aqueous phase. For further details, reference is made to Römpp, op. cit., "hydrophilicity", "hydrophobicity", pages 294 and 295.

The hydrophobic additives are preferably selected from the group consisting of (1) at least one hydrophobic crosslinking agent for the (co)polymer of the primary dispersion of the invention, resulting from the monomers;

(2) at least one polyhydroxy-functionalized cyclic or acyclic alkane having 9 to 16 carbon atoms in the molecule., and (3) at least one hydrophobic compound selected from the group consisting of esters of alpha,beta-monoolefinically unsaturated carboxylic acids having 3 to 6 carbon atoms with alcohols having 12 to 30 carbon atoms in the alkyl radical; esters of vinyl alcohol and/or allyl alcohol with alkanemonocarboxylic, alkanemonosulfonic and/or alkanemonophosphonic acids having 12 to 30 carbon atoms in the molecule; amides of alpha,beta-monoolefinically unsaturated carboxylic acids having 3 to 6 carbon atoms with alkylamines having 12 to 30 carbon atoms in the alkyl radical; macromonomers based on olefinically unsaturated compounds containing on average at least one, especially terminal, olefinically unsaturated group in the molecule; polysiloxane macromonomers containing on average at least one, especially terminal, olefinically unsaturated group in the molecule; oligomeric and/or polymeric products of addition polymerization, polycondensation and/or polyaddition; water-insoluble-molecular weight regulators, especially mercaptans; aliphatic, cycloaliphatic and/or aromatic halogenated and/or non-halogenated hydrocarbons; alkanols and/or alkylamines having at least 12 carbon atoms in the alkyl radical; organosilanes and/or organosiloxanes; vegetable, animal, semisynthetic and/or synthetic oils; and/or hydrophobic dyes;

of which the hydrophobic crosslinking agents and the polyhydroxy-functionalized cyclic and acyclic alkanes having 9 to 16 carbon atoms in the molecule are advantageous and are therefore used with preference.

With particular preference, the monomers are (co)polymerized in the presence of at least one hydrophobic crosslinking agent containing the above-described reactive functional groups (b) or (a) which undergo crosslinking reactions with the complementary reactive functional groups (a) or (b) that are present in the resulting (co)polymers. The resulting primary dispersions of the invention and the coating materials, adhesives, and sealing compounds of the invention prepared from them comprise the crosslinking agents in a state of particularly effective distribution, with the consequence that the crosslinking reactions proceed to a particularly good effect, so that it is possible to use less crosslinking agent than in the coating materials, adhesives, and sealing compounds prepared by prior art processes.

Examples of especially suitable hydrophobic crosslinking agents are blocked polyisocyanates, tris(alkoxycarbonylamino)triazines, and fully etherified amino resins.

Examples of suitable blocking agents for preparing the blocked polyisocyanates are the blocking agents known from the U.S. Pat. No. 4,444,954 A:

i) phenols such as phenol, cresol, xylenol, nitrophenol, chlorophenol, ethylphenol, t-butylphenol, hydroxybenzoic acid, esters of this acid, or 2,5-di-tert-butyl-4-hydroxytoluene;

ii) lactams, such as ϵ-caprolactam, δ-valerolactam, γ-butyrolactam or β-propiolactam;

iii) active methylenic compounds, such as diethyl malonate, dimethyl malonate, ethyl or methyl acetoacetate, or acetylacetone;

iv) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, propylene glycol monomethyl ether, methoxymethanol, glycolic acid, glycolic esters, lactic acid, lactic esters, methylolurea, methylolmelamine, diacetone alcohol, ethylenechlorohydrin, ethylenebromohydrin, 1,3-dichloro-2-propanol, 1,4-cyclohexyldimethanol or acetocyanohydrin;

v) mercaptans such as butyl mercaptan, hexyl mercaptan, t-butyl mercaptan, t-dodecyl mercaptan, 2-mercaptobenzothiazole, thiophenol, methylthiophenol or ethylthiophenol;

vi) acid amides such as acetoanilide, acetoanisidinamide, acrylamide, methacrylamide, acetamide, stearamide or benzamide;

vii) imides such as succinimide, phthalimide or maleimide;

viii) amines such as diphenylamine, phenylnaphthylamine, xylidine, N-phenylxylidine, carbazole, aniline, naphthylamine, butylamine, dibutylamine or butylphenylamine;

ix) imidazoles such as imidazole or 2-ethylimidazole;

x) ureas such as urea, thiourea, ethyleneurea, ethylenethiourea or 1,3-diphenylurea;

xi) carbamates such as phenyl N-phenylcarbamate or 2-oxazolidone;

xii) imines such as ethyleneimine;

xiii) oximes such as acetone oxime, formaldoxime, acetaldoxime, acetoxime, methyl ethyl ketoxime, diisobutyl ketoxime, diacetyl monoxime, benzophenone oxime or chlorohexanone oximes;

xiv) salts of sulfurous acid such as sodium bisulfite or potassium bisulfite;

xv) hydroxamic esters such as benzyl methacrylohydroxamate (BMH) or allyl methacrylohydroxamate; or xvi) substituted pyrazoles, especially dimethylpyrazole or triazoles; and also xvii) mixtures of these blocking agents, especially dimethylpyrazole and triazoles, malonic esters and acetoacetic esters or dimethylpyrazole and succinimide.

Examples of suitable organic polyisocyanates for blocking are, in particular, the polyisocyanates known as paint polyisocyanates, containing isocyanate groups attached to aliphatic, cycloaliphatic, araliphatic and/or aromatic moieties. Preference is given to polyisocyanates containing from 2 to 5 isocyanate groups per molecule and having viscosities of from 100 to 10 000, preferably from 100 to 5 000.

Examples of suitable polyisocyanates for blocking are polyisocyanates containing isocyanurate, biuret, allophanate, iminooxadiazinedione, urethane, urea and/or uretdione groups. Polyisocyanates containing urethane groups, for example, are obtained by reacting some of the isocyanate groups with polyols, such as trimethylolpropane and glycerol, for example.

To prepare the polyisocyanates for blocking it is preferred to use aliphatic or cycloaliphatic diisocyanates, especially hexamethylene diisocyanate, isophorone diisocyanate, dicyclohexylmethane 2,4'-diisocyanate, dicyclohexylmethane 4,4'-diisocyanate, diisocyanates derived from dimer fatty acids, as sold under the commercial designation DDI 1410 by the company Henkel and described in the patents WO 97/49645 and WO 97/49747, especially 2-heptyl-3,4-bis(9-isocyanatononyl)-1-pentylcyclohexane; or 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop- 1-yl)cyclohexane or 1,2-, 1,4- or 1,3-bis(4-isocyanatobut-1-yl)cyclohexane, 1,8-diisocyanato-4-isocyanatomethyloctane, 1,7-diisocyanato-4-isocyanatomethylheptane or 1-isocyanato-2-(3-isocyanatopropyl)cyclohexane, or mixtures thereof.

The diisocyanates may per se likewise be used to prepare blocked diisocyanates. Preferably, however, they are used not alone but instead in a mixture with the polyisocyanates.

Very particular preference is given to using mixtures of polyisocyanates containing uretdione and/or isocyanurate groups and/or allophanate groups and based on hexamethylene diisocyanate, as are formed by catalytic oligomerization of hexamethylene diisocyanate using appropriate catalysts.

Examples of especially suitable, fully etherified amino resins are melamine resins, guanamine resins or urea resins. In this context it is possible to use any amino resin suitable for clearcoat materials, or a mixture of such amino resins. For further details, reference is made to Römpp, op. cit., page 29, "amino resins", and to the textbook "Lackadditive" [Additives for coatings] by Johan Bieleman, Wiley-VCH, Weinheim, N.Y., 1998, pages 242 ff., or to the book "Paints, Coatings and Solvents", second, completely revised edition, D. Stoye and W. Freitag (eds.), Wiley-VCH, Weinheim, N.Y., 1998, pages 80 ff. Also suitable are the customary and known amino resins some of whose methylol and/or methoxymethyl groups have been defunctionalized by means of carbamate or allophanate groups. Crosslinking agents of this kind are described in the patents U.S. Pat. No. 4,710,542 A1 and EP 0 245 700 B1 and also in the article by B. Singh and coworkers, "Carbamylmethylated Melamines, Novel Crosslinkers for the Coatings Industry", in Advanced Organic Coatings Science and Technology Series, 1991, volume 13, pages 193 to 207.

The especially suitable tris(alkoxycarbonylamino)triazines have the following formula:

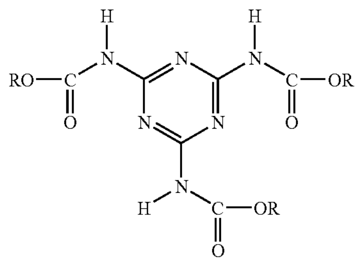

Examples of especially suitable tris(alkoxycarbonylamino)triazines are described in the U.S. Pat. Nos. 4,939,213 A, 5,084,541 A, and EP 0 624 577 A1. Use is made in particular of the tris(methoxy-, tris(butoxy- and/or tris(2-ethylhexoxycarbonylamino)triazines.

The methyl butyl mixed esters, the butyl 2-ethylhexyl mixed esters, and the butyl esters are of advantage. They have the advantage over the straight methyl ester of better solubility in polymer melts, and also have less of a tendency to crystallize out.

Of the above-described crosslinking agents, the blocked polyisocyanates afford particular advantages and are therefore used with very particular preference in accordance with the invention.

In the process of the invention, the ratio of the monomers containing complementary reactive functional groups (a) or (b) to the crosslinking agents may vary very widely. It is of advantage in accordance with the invention if the molar ratio of complementary reactive functional groups (a) or (b) in the copolymers to complementary reactive functional groups (a) or (b) in the crosslinking agents is from 5.0:1.0 to 1.0:5.0, preferably from 4.0:1.0 to 1.0:4.0, with particular preference from 3.0:1.0 to 1.0:3.0, and in particular from 2.0:1 to 1:2.0. Particular advantages result if the molar ratio is approximately or precisely 1.0:1.0.

Furthermore, the ratio of the total amount of the monomers to the hydrophobic crosslinking agents may vary very widely. It is of advantage in accordance with the invention if from 20 to 200, more preferably from 40 to 160, with particular preference from 60 to 140, with very particular preference from 80 to 130, and in particular from 90 to 120, parts by weight of at least one hydrophobic crosslinking agent are used per 100 parts by weight of monomers.

The functionalized alkanes are derived from branched, cyclic or acyclic alkanes having 9 to 16 carbon atoms, which in each case form the parent structure.

Examples of suitable alkanes of this kind having 9 carbon atoms are 2-methyloctane, 4-methyloctane, 2,3-dimethylheptane, 3,4-dimethylheptane, 2,6-dimethylheptane, 3,5-dimethylheptane, -2-methyl-4-ethylhexane, and isopropylcyclohexane.

Examples of suitable alkanes of this kind having 10 carbon atoms are 4-ethyloctane, 2,3,4,5-tetramethylhexane, 2,3-diethylhexane, and 1-methyl-2-n-propylcyclohexane.

Examples of suitable alkanes of this kind having 11 carbon atoms are 2,4,5,6-tetramethylheptane and 3-methyl-6-ethyloctane.

Examples of suitable alkanes of this kind having 12 carbon atoms are 4-methyl-7-ethylnonane, 4,5-diethyloctane, 1'-ethylbutylcyclohexane, 3,5-diethyloctane, and 2,4-diethyloctane.

Examples of suitable alkanes of this kind having 13 carbon atoms are 3,4-dimethyl-5-ethylnonane and 4,6-dimethyl-5-ethylnonane.

An example of a suitable alkane of this kind having 14 carbon atoms is 3,4-dimethyl-7-ethyldecane.

Examples of suitable alkanes of this kind having 15 carbon atoms are 3,6-diethylundecane and 3,6-dimethyl-9-ethylundecane.

Examples of suitable alkanes of this kind having 16 carbon atoms are 3,7-diethyldodecane and 4-ethyl-6-isopropylundecane.

Of these parent structures, the alkanes having 10 to 14, and especially 12, carbon atoms are particularly advantageous and are therefore used with preference. Of these, in turn, the octane derivatives are very especially advantageous.

For the invention it is advantageous if the functionalized alkanes have a boiling point of more than 200, preferably 220, and in particular 240° C. Furthermore, they should have a low evaporation rate.

For the coating materials of the invention it is of advantage if the functionalized alkanes are acyclic.

The functionalized alkanes generally have primary and/or secondary hydroxyl groups. For the coating materials of the invention it is of advantage if primary and secondary groups are present in one compound.

Very especially advantageous coating materials of the invention are obtained if the diols are positionally isomeric dialkyloctanediols, especially positionally isomeric diethyloctanediols.

The positionally isomeric diethyloctanediols for use in accordance with the invention contain a linear $C_8$ carbon chain.

With regard to the two ethyl groups, the $C_8$ carbon chain has the following substitution pattern: 2,3, 2,4, 2,5, 2,6, 2,7, 3,4, 3,5, 3,6 or 4,5. In accordance with the invention it is of advantage if the two ethyl groups are in positions 2 and 4, i.e., if the compounds are 2,4-diethyloctanediols.

With regard to the two hydroxyl groups, the $C_8$ carbon chain has the following substitution pattern: 1,2, 1,3, 1,4, 1,5, 1,6, 1,7, 1,8, 2,3, 2,4, 2,5, 2,6, 2,7, 2,8, 3,4, 3,5, 3,6, 3,7, 3,8, 4,5, 4,6, 4,8, 5,6, 5,7, 5,8, 6,7, 6,8 or 7,8. In accordance with the invention it is of advantage if the two hydroxyl groups are in positions 1 and 5, i.e., if the compounds are diethyloctane-1,5-diols.

The two substitution patterns are combined with one another in any desired manner, i.e., the diethyloctanediols for use in accordance with the invention comprise 2,3-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7,8-diol, 2,4-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7,8-diol, 2,5-diethyloctane-1,2-, -1,3-, -1,4-, -1,5-, -1,6-, -1,7-, 1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7,8-diol, 2,6-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7,8-diol, 2,7-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7,8-diol, 3,4-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7-,8-diol, 3,5-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7,8-diol, 3,6-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7,8-diol, or 4,5-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7,8-diol.

The positionally isomeric diethyloctanediols may be used as individual compounds or as mixtures of two or more diethyloctanediols.

Very particular advantages result from the use of 2,4-diethyloctane-1,5-diol.

The positionally isomeric diethyloctanediols used with preference are compounds which are known per se and may be prepared with the aid of customary and known synthesis methods of organic chemistry such as base-catalyzed aldol condensation, or are obtained as byproducts of industrial chemical syntheses such as the preparation of 2-ethylhexanol.

The amount of functionalized alkanes employed in preparing the primary dispersions of the invention may vary very widely and is guided by the requirements of each individual case. In other words, the amount is limited at the upper end in particular by the consideration that it should not hinder the formation of the microemulsion or miniemulsion and/or reduce its stability and/or should not adversely affect the (co)polymerization of the monomers. At the bottom end the amount is limited by the need to use a sufficient amount of functionalized alkanes to ensure that their technical effects are reliably established. In accordance with the invention it is of advantage to use from 1 to 30, preferably from 2 to 28, with particular preference from 3 to 26, with very particular preference from 4 to 24, and in particular from 5 to 22 parts by weight of at least one functionalized alkane per 100 parts by weight of monomers.

Moreover, the monomers described above are (co)polymerized in the presence of at least one oligomeric polyester with a number-average molecular weight of from 150 to 1 500, preferably from 155 to 1 000, more preferably from 160 to 800, with particular preference from 165 to 600, with very particular preference from 170 to 400, and in particular from 175 to 300 daltons, a hydroxyl number of from 100 to 1 000, preferably from 150 to 950, more preferably from 200 to 900, with particular preference from 250 to 850, with very particular preference from 300 to 800, and in particular from 350 to 750 mg KOH/g, and an acid number<20, preferably<19, more preferably<17, with particular preference<16, with very particular preference<14, and in particular<15 mg.KOH/g.

Preferably, the oligomeric polyesters are branched.

The oligomeric polyesters are prepared by reacting polyols and polycarboxylic acids and/or their esterifiable derivatives, such as anhydrides and/or esters. The branches are introduced by at least trifunctional compounds selected from the group consisting of polyols, polycarboxylic acids, polycarboxylic anhydrides, and polycarboxylic esters.

Examples of suitable polycarboxylic acids are aromatic, aliphatic, and cycloaliphatic polycarboxylic acids. It is preferred to use aromatic and/or aliphatic dicarboxylic acids.

Examples of suitable aromatic dicarboxylic acids are phthalic acid, isophthalic acid, terephthalic acid, phthalic, isophthalic or terephthalic monosulfonate, or halophthalic acids, such as tetrachloro- and tetrabromophthalic acid, of which isophthalic acid is advantageous and is therefore used with preference.

Examples of suitable acyclic aliphatic or unsaturated dicarboxylic acids are oxalic acid, malonic acid, succinic acid, glutaric acid, adipic acid, pimelic acid, suberic acid, azelaic acid, sebacic acid, undecanedicarboxylic acid, and dodecanedicarboxylic acid, and maleic acid, fumaric acid and itaconic acid.

Examples of suitable cycloaliphatic and cyclic unsaturated dicarboxylic acids are 1,2-cyclobutanedicarboxylic acid, 1,3-cyclobutanedicarboxylic acid, 1,2-cyclopentanedicarboxylic acid, 1,3-cyclopentanedicarboxylic acid, hexahydrophthalic acid, 1,3-cyclohexanedicarboxylic acid, 1, 4-cyclohexanedicarboxylic acid, 4-methylhexahydrophthalic acid, tricyclodecanedicarboxylic acid, tetrahydrophthalic acid, and 4-methyltetrahydrophthalic acid. These dicarboxylic acids may be used in both their cis and their trans form, and also as a mixture of both forms.

Further examples of suitable dicarboxylic acids are polymeric fatty acids, especially those having a dimer content of more than 90% by weight, which are also referred to as dimer fatty acids.

Also suitable are the esterifiable derivatives of the above-mentioned dicarboxylic acids, such as their monoesters or polyesters with aliphatic alcohols having 1 to 4 carbon atoms, for example. Furthermore, the anhydrides of the abovementioned dicarboxylic acids may also be used, where they exist.

If desired, it is also possible to use monocarboxylic acids, such as benzoic acid, tert-butylbenzoic acid, lauric acid, isononanoic acid, or fatty acids of naturally occurring oils, for example.

Examples of suitable polyols are diols.

Examples of suitable diols are ethylene glycol, 1,2- or 1,3-propanediol, 1,2-, 1,3- or 1,4-butanediol, diethylene glycol, dipropylene glycol, 1,2-, 1,3-, 1,4- or 1,5-pentanediol, 1,2-, 1,3-, 1,4-, 1,5- or 1,6-hexanediol, neopentyl hydroxypivalate, neopentyl glycol, 1,2-, 1,3- or 1,4-cyclohexanediol, 1,2-, 1,3- or 1,4-cyclohexanedimethanol, trimethylpentanediol, ethylbutylpropanediol, the positionally isomeric diethyloctanediols, 2-butyl-2-ethylpropane-1,3-diol, 2-butyl-2-methylpropane-1,3-diol, 2-phenyl-2-methylpropane-1,3-diol, 2-propyl-2-ethylpropane-1,3-diol, 2-di-tert-butylpropane-1,3-diol, 2-butyl-2-propylpropane-1,3-diol, 1-dihydroxymethylbicyclo[2.2.1]-heptane, 2,2-diethylpropane-1,3-diol, 2,2-dipropylpropane-1,3-diol, 2-cyclohexyl-2-methylpropane-1,3-diol, 2,5-dimethylhexane-2,5-diol, 2,5-diethylhexane-2,5-diol, 2-ethyl-5-methylhexane-2,5-diol, 2,4-dimethylpentane-2,4-diol, 2,3-dimethylbutane-2,3-diol, 1,4-bis(2'-hydroxypropyl)benzene, 1,3-bis(2'-hydroxypropyl)benzene, or the functionalized alkanes described above.

Of these diols, diethylene glycol and neopentyl glycol are particularly advantageous and are therefore used with particular preference.

Examples of suitable at least trifunctional polyols are trimethylolethane, trimethylolpropane, glycerol, pentaerythritol, homopentaerythritol, sorbitol, mannitol, dulcitol, glucitol, erythritol, pyrogallol, and resorcinol, especially trimethylolpropane.

Examples of suitable at least trifunctional polycarboxylic acids are the benzenetricarboxylic acids, hexane-2,3,5-tricarboxylic acid, naphthalene-1,3,5-tricarboxylic acid, and benzene-1,2,4,5-tetracarboxylic acid.

Examples of suitable at least trifunctional polycarboxylic esters are the esters of the above-described at least trifunctional polycarboxylic acids with alcohols having 1 to 4 carbon atoms.

Examples of suitable at least trifunctional polycarboxylic anhydrides are the anhydrides of trimellitic acid and benzene-1,2,4,5-tetracarboxylic acid.

The oligomeric polyesters are prepared in accordance with the known methods of esterification, as described for example in the German patent application DE 40 24 204 A1, page 4 lines 50 to 65. The reaction is normally conducted at temperatures between 180 and 280° C., in the presence if desired of an appropriate esterification catalyst, such as lithium octoate, dibutyltin oxide, dibutyltin dilaurate, or para-toluenesulfonic acid, for example. It is also possible to use the heterogeneous esterification catalysts known from the German patent application DE 199 07 861 A1.

The oligomeric polyester may be prepared in the presence of small amounts of a suitable solvent as azeotrope former. Examples of azeotrope formers used are aromatic hydrocarbons, such as in particular xylene and (cyclo)aliphatic hydrocarbons, e.g., cyclohexane or methylcyclohexane. It should be ensured that the azeotrope formers are removed from the oligomeric polyester following preparation, so that no volatile organic compounds are entrained into the primary dispersions of the invention.

In the process of the invention, the ratio of monomers to the oligomeric polyesters may vary widely. It is preferred to employ from 1 to 30, more preferably from 2 to 28, with particular preference from 3 to 26, with very particular preference from 4 to 24, and in particular from 5 to 22, parts by weight of at least one oligomeric polyester per 100 parts by weight of monomers.

Moreover, the monomers may be (co)polymerized in the presence of emulsifiers and/or protective colloids. Examples of suitable emulsifiers and/or protective colloids, and the amounts in which they are advantageously employed, are disclosed in the German patent application DE 196 28 142 A1, page 3 lines 8 to 48.

As regards the molecular weight distribution, the (co)polymers formed from the monomers are not subject to any -restrictions whatsoever. Advantageously, however, the (co)polymerization is conducted in such a way as to give a molecular weight distribution Mw/Mn, measured by gel permeation chromatography using polystyrene as standard, of $\leqq 10$, with particular preference $\leqq 7$, and especially $\leqq 4$.

Where the monomers I are used, a further, additional advantage is that, indeed, the molecular weights of the copolymers may be controlled within wide limits through the choice of the ratio of monomer to monomer I to free-radical initiator. In this relationship the amount of monomer I in particular determines the molecular weight, specifically such that the greater the fraction of monomer I the lower the molecular weight obtained.

Suitable reactors for the (co)polymerization processes are the customary and known stirred tanks, stirred-tank cascades, tube reactors, loop reactors or Taylor reactors, as described for example in the patents DE 198 28 742 A1 and EP 0 498 583 A1 and in the article by K. Kataoka in Chemical Engineering Science, Volume 50, No. 9, 1995, pages 1409 to 1416. The free-radical copolymerization is preferably conducted in stirred tanks or Taylor reactors, the Taylor reactors being designed so that the conditions of Taylor flow are met over the entire reactor length, even if the kinematic viscosity of the reaction medium changes sharply—in particular, increases—owing to the copolymerization (cf. the German patent application DE 198 28 742 A1).

The (co)polymerization is conducted in a aqueous medium.

The aqueous medium contains mainly water. In addition to the hydrophobic additives described in detail above and, if desired, the emulsifiers and/or protective colloids described above, the aqueous medium may further comprise the customary coatings additives described below, and/or other dissolved organic and/or inorganic substances of low and/or high molecular mass, in minor amounts, provided these do not adversely affect the (co)polymerization or even inhibit the (co)polymerization, and/or do not result in the emission of volatile organic compounds in the coating materials, adhesives, and sealing compounds of the invention. In the context of the present invention, the term "minor amount" means an amount which does not destroy the aqueous character of the aqueous medium.

The aqueous medium may, however, also comprise water on its own.

The (co)polymerization is advantageously conducted at temperatures above room temperature, preference being given to the choice of a temperature range of from 30 to 95° C., with very particular preference from 40 to 90° C.

If using particularly volatile monomers, the (co)polymerization may also be conducted under pressure, preferably under from 1.5 to 3 000 bar, with particular preference from 5 to 1 500 bar, and in particular from 10 to 1 000 bar. In specific cases, temperatures higher than 95° C. may also be employed.

In this context, it proves to be a particular advantage of the process of the invention that it may also be conducted in batch mode. Otherwise, it is also possible to employ the procedures described in the German patent application DE 196 28 142 A1, page 4 lines 6 to 36.

The (co)polymerization is conducted in a microemulsion or miniemulsion, especially a miniemulsion. In this case the average particle diameter of the emulsified monomer droplets is below 500 nm. It is preferably from 10 to 500 nm, more preferably from 50 to 400 nm, and with very particular preference from 100 to 350 nm. The particle diameter in question is the z-average particle diameter determined by means of photon correlation spectroscopy in accordance with the principle of dynamic, quasielastic light scattering. For this purpose it is possible, for example, to utilize a Coulter N4 Plus Particle Analyzer from Coulter Scientific Instruments or a PCS Malver Zetasizer 1000. The measurement is normally conducted on an aqueous emulsion containing 0.01% by weight of the emulsified monomer droplets. In the aqueous phase, the aqueous emulsion further comprises the corresponding monomers in dissolved form (up to the saturation point), so that the emulsified monomer droplets do not break up.

The preparation of the primary dispersion of the invention may be designed so as to give the bimodal particle size distribution described above. Methods of producing bimodal particle size distributions are customary and known in the technological field in question here. It is preferred to employ the seed method described in the German patent application DE 196 28 142 A1, page 5 lines 31 to 49.

The preparation of the miniemulsions has no special features in terms of its method but instead takes place in accordance with the customary and known methods of dispersing or emulsifying in a high shear field. Examples of suitable methods are described in the patent applications DE 196 28 142 A1, page 5 lines 1 to 30, DE 196 28 143 A1, page 7 lines 30 to 58, and EP 0 401 565 A1, lines 27 to 51.

Besides the constituents described above, the primary dispersions of the invention may further comprise at least one typical coatings additive.

The typical coatings additives may be added to the primary dispersions of the invention after, during or before their preparation. It is also possible to combine these measures with one another.

The typical coatings additives are preferably selected from the group consisting of color and/or effect pigments, magnetically shielding pigments, electrically conductive pigments, and fluorescent pigments, metal powders, organic and inorganic, transparent and opaque fillers, nanoparticles, organic dyes, crosslinking agents, secondary polyurethane dispersions, as described for example in the German patent application DE 199 14 896 A1, column 1 lines 29 to 49, column 1 line 67 to column 2 line 9, column 4 line 23 to column 11 line 5, and column 19 line 12 to column 20 line 65, or in the German patent application DE 44 37 535 A1, page 2 lines 27 to page 6 line 22, and page 7 line 55 to page 8 line 23, UV absorbers, nonregenerable free-radical scavengers, regenerable free-radical scavengers, especially sterically hindered amines (HALS) which scavenge peroxide radicals in accordance with the Denisov cycle (cf. Römpp, op. cit., page 128, "Denisov cycle"), devolatilizers, slip additives, polymerization inhibitors, crosslinking catalysts, thermolabile free-radical initiators, photoinitiators, thermally curable reactive diluents, reactive diluents curable with actinic radiation, adhesion promoters, leveling agents, film-forming auxiliaries, defoamers, emulsifiers, wetting agents, dispersants, rheology control additives (thickeners), flame retardants, corrosion inhibitors, waxes, and flatting agents. These typical coatings additives are described, for example, in the German patent application DE 199 14 896 A1, column 14 line 6 to column 15 line 9. Suitable crosslinking agents are those described above, including the free polyisocyanates which are used if the coating material of the invention is formulated as a two-component system.

The color and/or effect pigments, magnetically shielding pigments, electrically conductive pigments and fluorescent pigments, metal powders, and organic and inorganic, opaque fillers are used if the primary dispersions of the invention or the coating materials prepared from them are used as primer-surfacers, solid-color topcoat materials or aqueous basecoat materials, but especially as aqueous basecoat materials as part of the technique known as the wet-on-wet technique (cf. for example, the European patent EP 0 089 497 B1) for producing multicoat color and/or effect coating systems. The other typical coatings additives may be used both in the pigmented primary dispersions of the invention and in the unpigmented primary dispersions of the invention, or in the clearcoat materials prepared from them. The primary dispersions of the invention are preferably also unpigmented in their utility as adhesives or sealing compounds or for the preparation of adhesives or sealing compounds.

Where the primary dispersions of the invention or the coating materials, adhesives, and sealing compounds prepared from them are also to be curable with actinic radiation (dual cure), they include additives which are curable with actinic radiation. The actinic radiation may comprise electromagnetic radiations such as near infrared (NIR), visible light, UV light or X-rays, or corpuscular radiation such as electron beams. Examples of suitable additives curable with actinic radiation are known from the German patent DE 197 09 467 C1.

The primary dispersions of the invention are stable on storage and also show no tendency for constituents to separate out, even after large temperature fluctuations. They may therefore be transported without problems over long distances without detriment to their advantageous profile of performance properties.

In terms of method, the application of the primary dispersions of the invention has no special features but instead may take place by any customary application method, such as spraying, knife coating, brushing, flow coating, dipping, trickling or rolling, for example. It is preferred to employ spray application methods, such as compressed air spraying, airless spraying, high-speed rotation, electrostatic spray application (ESTA), for example, alone or in conjunction with hot spray applications such as hot-air spraying, for example.

Suitable coating substrates are all surfaces which are not damaged by curing with the coating films present thereon using heat. The substrates consist preferably of metals, plastics, wood, ceramic, stone, textile, fiber composites, leather, glass, glass fibers, glass wool, rock wool, mineral- and resin-bound building materials, such as plasterboard and cement slabs and roofing tiles, and also composites of these materials.

Accordingly, the primary dispersions of the invention and, respectively, the coating materials, adhesives, and sealing compounds prepared from them, especially the coating materials, are also outstandingly suitable for applications outside of automotive finishing. In this context they are particularly suitable for the painting of buildings inside and outside, the coating of doors, windows, and furniture, industrial coating, including coil coating, container coating, and the impregnation and/or coating of electrical components, and also the coating of white goods, including domestic appliances, boilers, and radiators. In the context of industrial coatings they are suitable for coating virtually all parts and articles for private or industrial use, such as domestic appliances, small metal parts such as nuts and bolts, hubcaps, wheel rims, packaging, or electrical components, such as motor windings or transformer windings.

In the case of electrically conductive substrates it is possible to use primers produced in a customary and known manner from electrodeposition coating materials. Both anodic and cathodic electrodeposition coating materials are suitable for this purpose, but especially cathodic materials. Nonfunctionalized and/or nonpolar plastics surfaces may be subjected prior to coating in a known manner to a pretreatment, such as with a plasma or by flaming, or may be provided with a water-based primer.

The curing of the applied primary dispersions of the invention and of the coating materials, adhesives, and sealing compounds prepared from them also has no special features in terms of method but instead takes place in accordance with the customary and known thermal methods such as heating in a forced-air oven or irradiation with IR lamps, which in the case of dual cure may be supplemented further by exposure to actinic radiation. In this case it is possible to employ radiation sources such as high or low pressure mercury vapor lamps, with or without lead doping in order to open up a radiation window of up to 405 nm, or electron beam sources.

The resultant coatings, adhesive films, and seals of the invention, especially the single-coat or multicoat color and/or effect coating systems and clearcoats of the invention, are easy to produce and have outstanding optical properties and a high light, chemical, and weathering stability. In particular, the coatings are free of inhomogeneities and have a particularly high gloss and a particularly low haze. Accordingly, the substrates of the invention which comprise at least one coating of the invention are also of particularly high utility and have a particularly long service life, so making them particularly attractive both technically and economically to manufacturers and users.

EXAMPLES

Preparation Example 1

The Preparation of an Oligomeric Polyester Having a High Hydroxyl Number

In a steel reactor suitable for polycondensation reactions, 33.409 parts by weight of isophthalic acid, 28.76 parts by weight of neopentyl glycol, 24.792 parts by weight of trimethylolpropane and 13.039 parts by weight of diethylene glycol were condensed in a customary and known manner until an acid number of 10 mg KOH/g was reached. The resulting oligomeric polyester had a hydroxyl number of 583 mg KOH/g and a molar weight of 233 daltons. The solids content was 100% by weight.

Example 1

The Preparation of an Aqueous Primary Dispersion 58.4 parts by weight of deionized water containing 1.04 parts by weight of ammonium nonylphenyl ether sulfate (30% strength in water, Abex® EP 110) were added at room temperature to a mixture consisting of 4.3 parts by weight of methyl methacrylate, 5.2 parts by weight of n-butyl acrylate, 2.2 parts by weight of styrene, 4.7 parts by weight of hydroxypropyl methacrylate, 0.5 part by weight of diphenylethylene, 0.5 part by weight of 2,4-diethyloctane-1,5-diol, 0.3 part by weight of Tinuvin® 400 (commercial UV absorber based on triazine from Ciba, 85% strength in 2-methoxypropanol), 18.2 parts by weight of Crelan® VPLS (3,5-dimethylpyrazole-blocked aliphatic polyisocyanate based on isophorone diisocyanate), 1.5 parts by weight of the oligomeric polyester from preparation example 1 and 2.3 parts by weight of di (4-tert-butylcyclohexyl) peroxodicarbonate, and the mixture was homogenized using an Ultraturrax at 10 000 rpm for 40 seconds. The resulting preemulsion was subjected to ten minutes of pressure release homogenization using a nozzle jet disperser from Wagner at 180 bar and so was converted into a stable miniemulsion having a z-average particle size, measured by photon correlation spectroscopy (PCS Malvern Zetasizer 1000), of <230 nm. The miniemulsion was transferred to an appropriate steel reactor with stirrer and reflux condenser and was polymerized with stirring at a constant polymerization temperature of 70° C. until the theoretical solids content of 40% by weight was reached. The residual monomer content was then <0.1% by weight. It was not possible to observe any exothermicity on the basis of a comparison of the temperature of the oil (heating medium of the reactor) with the temperature of the reaction mixture.

Example 2

The Preparation of an Inventive Clearcoat Material 97.56 parts by weight of the aqueous primary dispersion of example 1 were introduced into a stirred tank. Added to this initial charge in succession with stirring were 1.46 parts by weight of a thickener (Collacral® VL, 30% strength aqueous solution of an N-vinylpyrrolidone copolymer) and 0.98 part by weight of a wetting agent (Byk® 348, polyether-modified polydimethylsiloxane). The resulting clearcoat material was stable on storage and showed no separation even after several months of storage.

Example 3

The Production of an Inventive Multicoat System

First of all a commercially customary aqueous primer-surfacer based on polyurethane, from BASF Coatings AG, was applied using a cup gun to steel panels coated cathodically with a commercially customary electrodeposition coating material (electrocoat with a thickness of 18–22 μm) and the panels were baked. This gave a primer-surfacer coat having a thickness of from 35 to 40 μm. Subsequently, in the same way, a commercially customary aqueous black solid-color basecoat material from BASF Coatings AG was applied to the primer-surfacer coat and was predried at 80° C. for 10 minutes. After the panels had cooled, a film of the inventive clearcoat material from example 2 was applied using a pneumatic spray gun. The resulting clearcoat films were predried at 50° C. for 10 minutes and then cured together with the basecoat films for 25 minutes at a panel temperature of 130° C. This gave basecoats with a thickness of from 12 to 15 μm and clearcoats with a thickness of from 40 to 50 μm. The black solid-color basecoat material was chosen since its color made it easiest to observe the formation of surface defects and film defects on the corresponding test panels.

The inventive multicoat system had an outstanding overall appearance. The gloss, measured by reflectometry in accordance with DIN 67530 at an angle of 20° using a reflectometer from BYK, was 89 and the haze was from 30 to 40.

What is claimed is:

1. An aqueous primary dispersion that is substantially or completely free from volatile organic compounds comprising a polymer having a diameter≦500 nm comprising a controlled free-radical microemulsion or miniemulsion polymerization product of at least one olefinically unsaturated monomer in the presence of at least one hydrophobic additive and at least one oligomeric polyester with a number-average molecular weight of from 150 to 1500 daltons, a hydroxyl number of from 100 to 1000 mg KOH/g, and an acid number<20 mg KOH/g, wherein the polymer is at least one of a dispersed solid polymer particle, an emulsified solid polymer particle, a dispersed liquid polymer particle, an emulsified liquid polymer particle, or a dispersed solid core-shell particle, wherein the at least one hydrophobic additive comprises at least one polyhydroxy-functionalized alkane that is cyclic or acyclic and has 9 to 16 carbon atoms in the molecule.

2. The aqueous primary dispersion of claim 1, wherein at least two different monomers are copolymerized.

3. The aqueous primary dispersion of claim 2, wherein one of the monomers is a monomer of general formula I $$R^1R^2C{=}CR^3R^4 \quad (I)$$

wherein $R^1$, $R^2$, $R^3$, and $R^4$ are each independently one of a hydrogen atom, an unsubstituted alkyl radical, an unsubstituted cycloalkyl radical, an unsubstituted alkylcycloalkyl radical, an unsubstituted cycloalkylalkyl radical, an unsubstituted aryl radical, an unsubstituted alkylaryl radical, an unsubstituted cycloalkylaryl radical, an unsubstituted arylalkyl radical, an unsubstituted arylcycloalkyl radical, a substituted alkyl radical, a substituted cycloalkyl radical, a substituted alkylcycloalkyl radical, a substituted cycloalkylalkyl radical, a substituted aryl radical, a substituted alkylaryl radical, a substituted cycloalkylaryl radical, a substituted arylalkyl radical, or a substituted arylcycloalkyl radical, with the proviso that at least two of $R^1$, $R^2$, $R^3$, and $R^4$ are at least one of an unsubstituted aryl radical, an unsubstituted arylalkyl radical, an unsubstituted arylcycloalkyl radical, a substituted aryl radical, a substituted arylalkyl radical, or a substituted arylcycloalkyl radical.

4. The aqueous primary dispersion of claim 3, wherein the aryl radical is one of a phenyl radical or a naphthyl radical.

5. The aqueous primary dispersion of claim 4, wherein the radicals are phenyl radicals.

6. The aqueous primary dispersion of claim 3, wherein at least one of $R^1$, $R^2$, $R^3$, or $R^4$ is one of a substituted alkyl radical, a substituted cycloalkyl radical, a substituted alkylcycloalkyl radical, a substituted cycloalkylalkyl radical, a substituted aryl radical, a substituted alkylaryl radical, a substituted cycloalkylaryl radical, a substituted arylalkyl radical, or a substituted arylcycloalkyl radical, wherein the substitutent of the substituted radical is one of an electron-withdrawing atom, an electron-donating atom, or an organic radical.

7. The aqueous primary dispersion of claim 3, wherein at least one of $R^1$, $R^2$, $R^3$, or $R^4$ is one of a substituted alkyl radical, a substituted cycloalkyl radical, a substituted alkylcycloalkyl radical, a substituted cycloalkylalkyl radical, a substituted aryl radical, a substituted alkylaryl radical, a substituted cycloalkylaryl radical, a substituted arylalkyl radical, or a substituted arylcycloalkyl radical, wherein the substituent of the substituted radical is at least one of a halogen atom, a nitrile, a nitro group, an at least partially halogenated alkyl radical, an at least partially halogenated cycloalkyl radical, an at least partially halogenated alkylcycloalkyl radical, an at least partially halogenated cycloalkylalkyl radical, an at least partially halogenated aryl radical, an at least partially halogenated alkyaryl radical, an at least partially halogenated cycloalkylaryl radical, an at least partially halogenated arylalkyl radical, or an at least partially halogenated arylcycloalkyl radical, an aryloxy radical, an alkyloxy radical, and a cycloalkyloxy radical, an arylthio radical, an alkylthio radical, a cylcoalkylthio radical, a primary amino group, a secondary amino group, or a tertiary amino group.

8. The aqueous primary dispersion of claim 1, wherein the at least one monomer is at least one of (1) a (meth)acrylic ester;

(2) a monomer that carries per molecule at least one of a hydroxyl group, a thio group, an amino group, an alkoxymethylamino group, a carbamate group, an allophanate group, or an imino group;

(3) a monomer that carries per molecule at least one acid group that can be converted into a corresponding acid anion group;

(4) a vinyl ester of an alpha-branched monocarboxylic acid having 5 to 18 carbon atoms in the molecule;

(5) a reaction product of a (meth)acrylic acid with a glycidyl ester of an alpha-branched monocarboxylic acid having from 5 to 18 carbon atoms per molecule;

(6) at least one of a cyclic olefin or an acyclic olefin;

(7) a (meth)acrylamide;

(8) a monomer containing at least one epoxide group;

(9) a vinylaromatic hydrocarbon;

(10) a nitrile;

(11) a vinyl compound;

(12) an allyl compound;

(13) a polysiloxane macromonomer having a number-average molecular weight Mn of from 1,000 to 40,000 and containing on average from 0.5 to 2.5 ethylenically unsaturated double bonds per molecule; or

(14) an acryloyloxysilane-containing vinyl monomer comprising a reaction product of a material and at least one of methacrylic acid or a hydroxyalkyl ester of (meth)acrylic acid, wherein the material comprises a reaction product of a hydroxy-functional silane and epichlorohydrin;

with the proviso that the monomer (3) is not used as the sole monomer.

9. The aqueous primary dispersion of claim 1, wherein the dispersed particles comprise cores of organic solids and shells of copolymers containing in copolymerized form at least one monomer that carries per molecule at least one acid group that can be converted into a corresponding acid anion group and at least one monomer other than this monomer.

10. The aqueous primary dispersion of claim 1, wherein the hydrophobic additive further comprises at least one of i) at least one hydrophobic crosslinking agent comprising at least one crosslinking agent for the (co)polymer of the aqueous primary dispersion;

ii) a hydrophobic dye;

iii) an ester of an α,β-monoolefinically unsaturated carboxylic acid, having 3 to 6 carbon atoms, with an alcohol having 12 to 30 carbon atoms in the alkyl radical;

iv) an ester of a) at least one of a vinyl alcohol or an allyl alcohol with b) at least one of an alkanemonocarboxylic acid, an alkanemonosulfonic acid, or an alkanemonophosphonic acid having 12 to 30 carbon atoms in the molecule;

v) an amide of an α,β-monoolefinically unsaturated carboxylic acid having 3 to 6 carbon atoms with an alkylamine having 12 to 30 carbon atoms in the alkyl radical;

vi) a macromonomer comprising an olefinically unsaturated compound having on average at least one olefinically unsaturated group in the molecule;

vii) a polysiloxane macromonomer having on average at least one olefinically unsaturated group in the molecule;

viii) at least one of an oligomeric reaction product or a polymeric reaction product of at least one of addition polymerization, polycondensation, or polyaddition;

ix) a water-insoluble molecular weight regulator;

x) at least one of an alkanol or an alkylamine having at least 12 carbon atoms in the alkyl radical;

xi) at least one of an organosilane or an organosiloxane; or xii) at least one of a vegetable oil, an animal oil, a semisynthetic oil, or a synthetic oil.

11. The aqueous primary dispersion of claim 10, wherein the hydrophobic additive further comprises the at least one hydrophobic crosslinking agent.

12. The aqueous primary dispersion of claim 11, wherein the hydrophobic crosslinking agent is at least one of a blocked polyisocyanate, a tris(alkoxycarbonylamino)triazine, or a fully etherified amino resin.

13. The aqueous primary dispersion of claim 1, wherein the at least one oligomeric polyester is a branched polyester.

14. The aqueous primary dispersion of claim 13, wherein branches of the branched polyester are introduced into the polyester by way of at least one trifunctional compound that is at least one of a polyol, a polycarboxylic acid, a polycarboxylic anhydride, or a polycarboxylic ester.

15. The aqueous primary dispersion of claim 14, wherein the trifunctional compound comprises trimethylolpropane.

16. The aqueous primary dispersion of claim 1 further comprising at least one coatings additive selected from the group consisting of color pigments, effect pigments, magnetically shielding pigments, electrically conductive pigments, fluorescent pigments, metal powders, organic fillers, inorganic fillers, transparent fillers, opaque fillers, nanoparticles, crosslinking agents, UV absorbers, nonregenerable free-radical scavengers, devolatilizers, slip additives, polymerization inhibitors, crosslinking catalysts, thermolabile free-radical initiators, photoinitiators, thermally curable reactive diluents, reactive diluents curable with actinic radiation, adhesion promoters, leveling agents, film-forming auxiliaries, defoamers, emulsifiers, wetting agents, dispersants, rheology control additives (thickeners), flame retardants, corrosion inhibitors, waxes, flatting agents, and combinations thereof.

17. A process for preparing the aqueous primary dispersion of claim 1 comprising (co)polymerizing by free-radical microemulsion or miniemulsion polymerization the at least one olefinically unsaturated monomer in the presence of the least one hydrophobic additive and the at least one oligomeric polyester.

18. A coating material comprising the aqueous primary dispersion of claim 1.

19. A process of coating a substrate comprising forming a coating on a substrate with the coating material of claim 18.

20. The process of claim 19, wherein the coating material is a clearcoat material or an aqueous basecoat material.

21. The process of claim 19, wherein the coating formed on a substrate is a multicoat color and/or effect coating system.

* * * * *